United States Patent [19]
Wendler et al.

[11] 4,294,159
[45] Oct. 13, 1981

[54] THREAD DELASHER IN VEHICLE STEERING GEAR

[75] Inventors: Paul O. Wendler, Saginaw; Clarence E. Welsh, Merrill, both of Mich.

[73] Assignee: General Motors Corporation, Detroit, Mich.

[21] Appl. No.: 77,855

[22] Filed: Sep. 21, 1979

[51] Int. Cl.³ ............................................. F15B 9/10
[52] U.S. Cl. .............................. 91/375 A; 74/424.8 R
[58] Field of Search ............... 91/375 A, 375 R, 380; 74/424.8 R, 388 PS

[56] References Cited

U.S. PATENT DOCUMENTS

| | | | |
|---|---|---|---|
| 525,780 | 9/1894 | Boynton | 74/424.8 R |
| 3,496,794 | 2/1970 | Forichon | |
| 4,009,641 | 3/1977 | Rohde et al. | 91/375 A |
| 4,217,811 | 8/1980 | Dzioba et al. | 91/375 A |
| 4,217,812 | 8/1980 | Byrne | 91/375 A |
| 4,217,813 | 8/1980 | Bradley | 91/375 A |

*Primary Examiner*—Paul E. Maslousky
*Attorney, Agent, or Firm*—Charles R. White

[57] ABSTRACT

Power steering gear with integral rotary valve for directing hydraulic pressure fluid to and from a hydraulically actuated rack piston nut drivingly connected to an output and in which an internal spring device effectively reduces lash in the threaded connection between the worm and rack piston nut so that the valve components will be immediately relatively rotated on stub shaft input from the handwheel for improved and quicker valve response.

3 Claims, 3 Drawing Figures

THREAD DELASHER IN VEHICLE STEERING GEAR

This invention relates to steering gears and more particularly to a hydraulic power steering gear with a new and improved delasher to eliminate play in the worm circuit to thereby produce improved steering response.

Many prior steering gear constructions contain threaded members such as the steering worm and rack piston nut which convert rotary motion of the steering handwheel into linear motion of the rack piston nut. The teeth of the piston nut rack mesh with the teeth of the sector gear of a pitman shaft operatively connected through associated steering linkage to the dirigible wheels of a vehicle. In smaller power steering gears where size reduction is important, acme threading utilized to drivingly connect the worm and rack piston nut permits design modifications that significantly reduce size and weight of the steering gear assembly.

In many power steering gears, a rotary hydraulic valve having relatively rotatable valve components is employed. The spool is this valve reacts directly to handwheel steering inputs by the vehicle driver, the body of this valve senses the resistance to turning of the dirigible wheels on the roadway through a series of component fits that include the acme thread connecting the worm and rack-piston nut. As solid metal parts, some amount of clearance or lash must be present in the threaded connection to permit relative motions of the mating surfaces. This clearance, however, represents lost motion or lash that reduces rotary valve responsiveness. In some instances large clearances while not adversely affecting steering may detract from steering response on turning input by the vehicle driver.

With the above in mind, it is a feature, object and advantage of this invention to provide a power steering gear having a system of axially loaded threaded members that, by exerting sufficient forces on opposite lengths of the acme thread of a power steering gear assembly, provides sufficient reaction for quicker valve response and steering response to driver handwheel input.

Another feature, object and advantage of this invention is to provide an improved spring design to provide axial spring forces to delash threaded members of a steering gear and to also torsionally position a locking nut to maintain spring load across opposing flanks of the thread.

Another feature, object and advantage of this invention is to minimize the axial length and diameter of a delashing thread system used in power steering gears.

Another feature, object and advantage of this invention is to provide a simplified assembly for a power steering gear in which a rack piston nut is threadedly connected to a nut and anti-lash construction that requires no specialized adjustment functions nor any specialized judgment functions from the person making the assembly.

These and other features, objects and advantages of this invention will become more apparent from the following detailed description and drawing in which.

Figure 1:
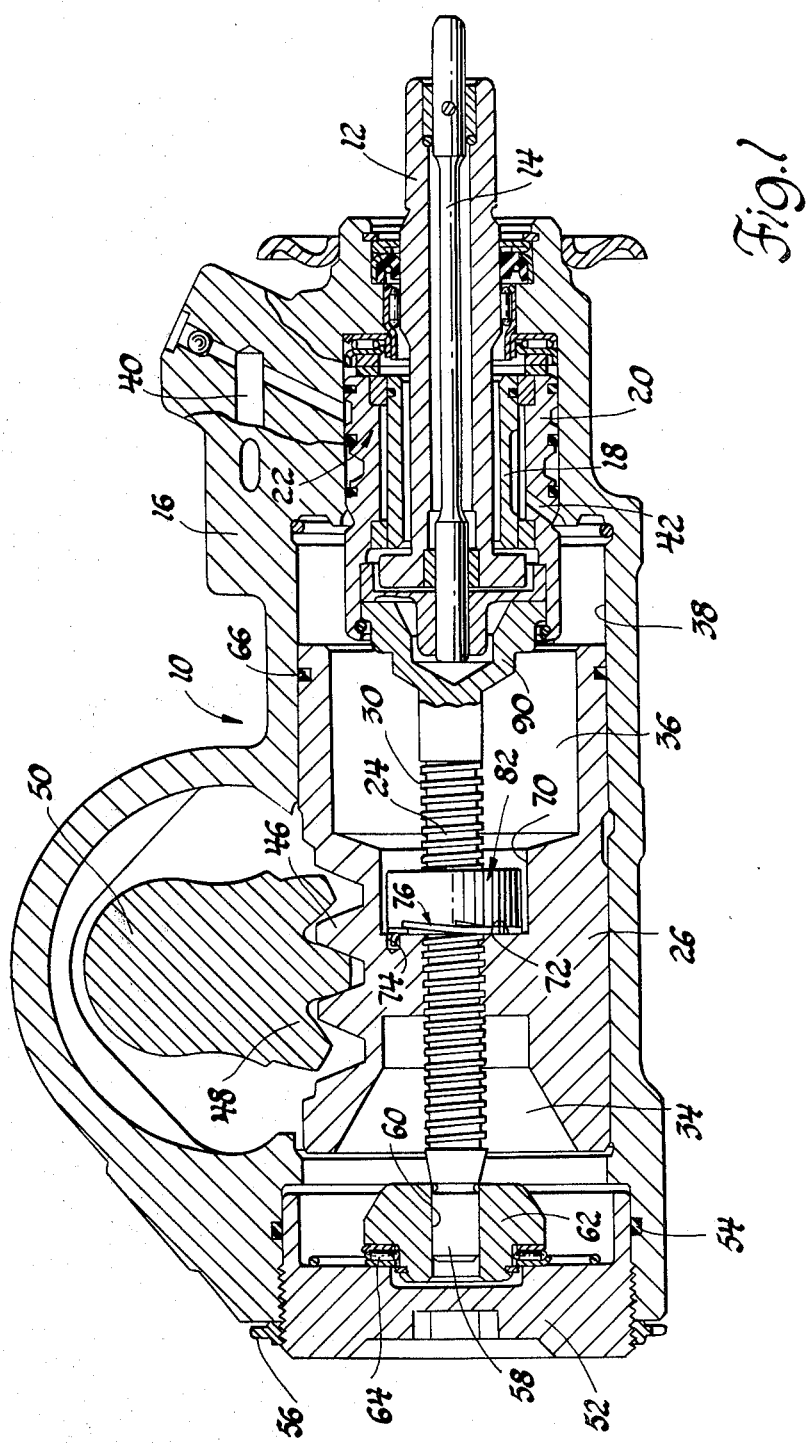
FIG. 1 is a side elevational view partially in section of an integral power steering gear with the acme thread delashing system of this invention.

Turning now in greater detail to the drawing, there is shown in FIG. 1 a power steering gear unit 10 having an elongated stub shaft 12, with a torsion bar 14 extending axially therethrough, operatively mounted in a power steering gear housing 16. The stub shaft and torsion bar are connected to each other at their outboard ends and respectively operatively connected at their inboard ends to relatively rotatable valve spool 18 and valve body 20 of a rotary valve assembly 22 mounted in the housing 16 and concentric with respect to the stub shaft. This valve assembly controls the hydraulic operation of the steering gear unit as disclosed in U.S. Pat. No. 3,022,772 to Ziegler et al for Rotary Power Steering Valve with Torsion Bar Centering and in U.S. Pat. No. 4,009,641 to Robert P. Rohde et al for Compact Power Steering Gear whose disclosures are hereby incorporated by reference into this specification.

An elongated and rotatable screw or worm 24 extends axially in housing 16 from the inboard end of the valve assembly 22 into a central bore in a rack piston nut 26 operatively mounted in this housing. Acme threads 28 and 30 respectively cut into the rack piston nut 26 and worm 24 drivingly mesh with each other and constitute the threaded connection between these elements. The valve assembly 22 is fed with pressure from a power steering pump as disclosed in the above referenced patents. The valve body 20 is relatively rotatable with respect to the valve spool 18 to control the supply and exhaust of fluid to and from expandable and contractible fluid chambers 34 and 36 formed on either side of the piston nut 26 which is slidably mounted in a cylindrical bore 38 formed in the power steering gear housing. Passages such as passage 40 in the power steering gear housing and passage 42 in the valve body hydraulically connect chambers 34 and 36 to the valve assembly 22. Return oil, which is a low pressure oil, leaves the valve assembly and housing through a suitable conduit, not shown, to the sump of a power steering pump as more fully described in the above referenced patents to Ziegler et al and Rohde et al.

The rack piston nut 26 has a rack whose teeth 46 mesh with the teeth 48 of the sector gear of a pitman shaft 50 mounted for turning movement in the housing 16. The pitman shaft is operatively connected through an associated steering linkage to the dirigible wheels of the vehicle not shown. The rack piston nut bore 38 of the steering gear housing is closed at one end in a fluid tight manner by a suitable plug 52 and annular seal 54. The plug is threaded to an axially adjusted position in the housing and is secured at this position by fastener ring 56. As shown, the worm 24 extends axially from the inner end of the valve body 20 of the valve assembly into the bore 38 and terminates in a small diameter end 58 fitted in an opening 60 formed in enlarged bearing member 62. A thurst bearing assembly 64 is interposed between member 62 and plug 52 to rotatably support the lower end of the worm 24. A seal 66 mounted in an annular groove in the outer periphery of the rack piston nut 26 contacts the cylindrical inner wall of the bore 38 to provide an outer sliding seal for the separate fluid chambers 34 and 36.

In a power steering unit such as described above, the rack piston nut and its acme thread connection to the worm is intermediate in a series of components linking the dirigible wheels of the vehicle to the valve assembly. Any lost motion due to clearance in the acme threads permits rotation of the worm and the valve assembly as a unit until the driving flanks of the meshing acme threads firmly contact. When such contact subsequently occurs, solid "reaction" to one side of the valving interface is provided so that the valve actuation by relative rotation of the valve body and spool can be initiated by rotary steering motion by the vehicle operator for the hydraulic powered operation of the gear. Similar lost motion effects are equally present for steering motions input in the opposite rotary direction.

Figure 2:
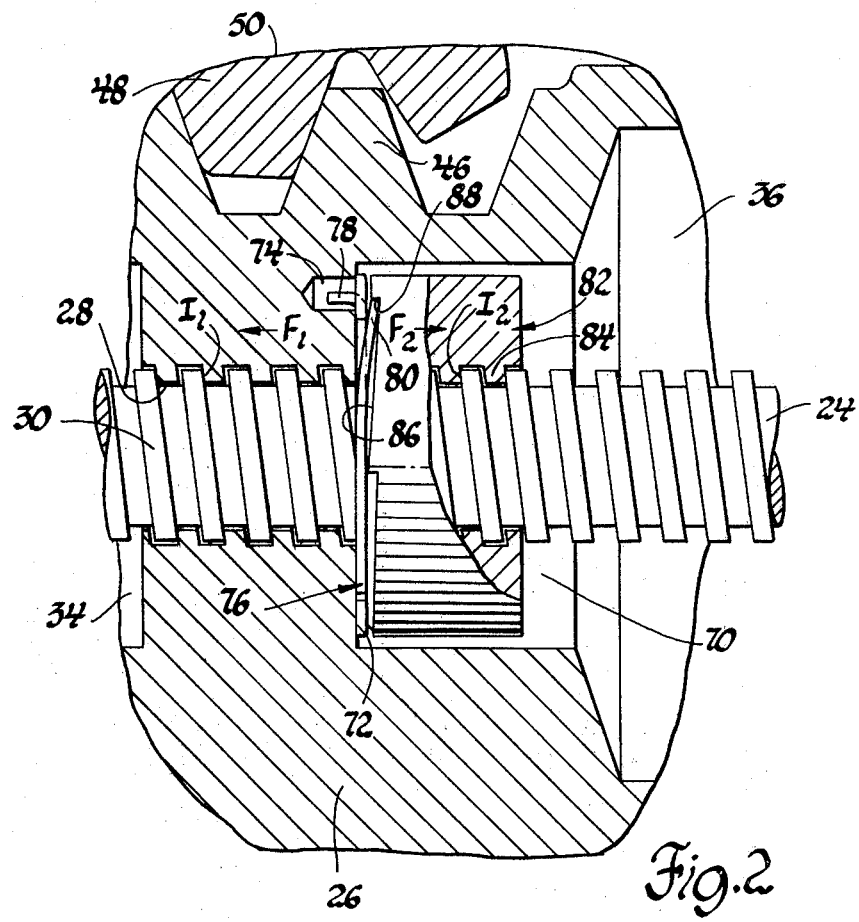
FIG. 2 is an enlarged view of a portion of FIG. 1 showing the delashing components in assembled position within the rack piston nut.
Figure 3:
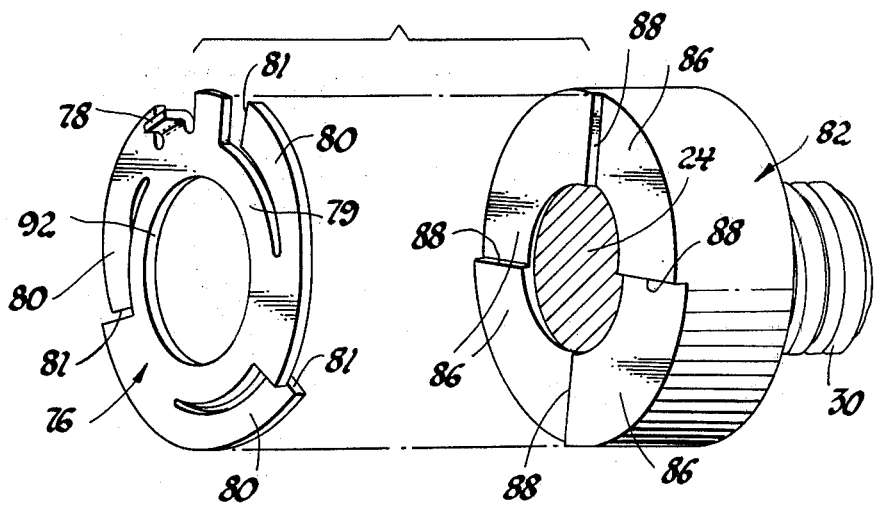
FIG. 3 is a perspective view of parts of the delashing component of this invention exploded to illustrate their construction.

The preferred delashing construction of this invention as shown in FIGS. 1 through 3 makes the valve assembly act quicker in response to steering inputs. In this construction the rack piston nut 26 has an axially cylindrical cavity 70 with a flat end face 72 having a short hole 74 machined therein. An annular metallic disc spring 76, adapted to be seated on the end face 72, has a tang 78 that extends into the hole 74 as best shown in FIGS. 2 and 3. The disc spring 76 is formed with a flat washer-like inner portion 79 encircled by three arcuately disposed spring arms or fingers 80 that arcuately incline away from the plane of the inner portion 79 toward a lock nut 82 threaded on the worm to a terminal postion within the cavity 70. Lock nut 82 has internal acme thread 84 which meshes with thread 30 on the worm 24. The lock nut further has four arcuate ratchet faces 86 providing steps 88 adapted to engage the ends of spring fingers 80 under certain conditions as described below. Ratchet faces 86 extend radially along the face of the lock nut from the threaded bore to the outer periphery thereof. The number of ratchet faces 86 in the lock nut and the number of spring fingers 80 can vary from that disclosed but are intentionally different in number so that only one finger engages any step 88 at one time. This effectively reduces the amount of relative rotation between the lock nut 82 and spring 76 between finger/step engagements.

At gear assembly, the spring 76 is initially placed into the rack piston nut cavity 70 so that the end face 72 of the cavity is engaged by the flat inner portion 79 of the spring and tang 78 is received in the hole 74. The arcuate spring fingers 80 incline outwardly and terminate in ends 81 axially spaced from the plane of the flat inner portion 79 of the spring 76. The lock nut 82 is then threaded over the worm 24 with ratchet faces 86 oriented toward the small diameter end of the worm until the lock nut bottoms on the enlarged head 90 of the worm. The worm is then threaded into the piston nut, through the center clearance hole 92 in disc spring 76 until the lock nut 82 engages spring fingers 80.

As additional torque is applied to the worm 24, the lock nut 82 turns with the worm and the spring fingers 80 resiliently deflect and sequentially snap over the lock nut ratchet steps 88. Finally the spring fingers 80 are deflected to a "solid height" or a flat condition under at least one ratchet ramp. At this point further lock nut advancement is stopped. Reversing rotation of the worm 24 allows the lock nut 82 to back off slightly until one of the spring fingers engage one of the steps or end faces of the ratchet to thereby secure the lock nut 82 in final position.

From the above it will be understood that the assembly sequence requires no manual or automated adjustment. Also, no special judgment or specialized skill need be exercised by the person making the assembly. It will also be understood that in the assembled position the axial space occupied by the spring is only slightly thicker than the thickness of the metal stock of the disc spring. The diameters of these components is dictated by the required operating load and acceptable stress levels in the spring fingers. Axial length is largely determined by the length of lock nut engagement desired but spring 76 is a minor contributing factor insofar as space is concerned.

In operation the spring and spring fingers provide the axial forces acting on opposing flanks of the acme threads in the rack piston nut and lock nut in engagement with threads on worm to delash the threaded connection. As shown in FIG. 2., for example, axial forces $F_1$ and $F_2$ are exerted by spring 76 in opposite direction on rack piston nut 26 and lock nut 82 so that the worm and rack piston nut threads have close flank engagement along the helical flank interface $I_1$ while the worm and lock nut threads have close flank engagement along the opposite helical flank interface $I_2$.

Unless torsionally restrained, the lock nut would retreat along the worm thread until disengaged from the spring. However, the tang prevents the spring from rotating while the engagement of the spring fingers into lock nut ratchet faces prevent the lock nut from rotating relative to the spring and rack piston nut. It will therefore be understood from the above that the spring performs the dual function of providing an axial load and rotational restraint to the lock nut.

By loading opposed flanks of the acme threaded components as described above, a new and improved construction is provided for effectively eliminating lost motion in acme threads connecting the rack piston nut and worm fit. This improves valve operating in response to steering input by the vehicle operator. Of necessity, the spring force must be sufficiently great enough that the torsion bar rate is first overcome providing prompt valve actuation and steering response to drive handwheel input.

While a preferred embodiment of the invention has been shown and described to illustrate the invention, other modifications will become apparent to those skilled in the art. Accordingly, the scope of this invention is set forth in the following claims.

The embodiments of the invention in which an exclusive property or privilege is claimed are defined as follows:

1. A power steering gear comprising a housing, an input member mounted for turning movement in said housing and extending from one end thereof, an output member operatively mounted for turning movement in said housing and extending outwardly therefrom, piston means mounted for longitudinal sliding movement in said housing and cooperating therewith to provide first and second expandable and contractible fluid chambers in said housing, passage means for supplying and exhausting pressure fluid from said chambers, rotatable worm means extending axially through said piston means and threadedly connected thereto, gear means operatively interconnecting said piston means and said output member so that movement of said piston means will produce movement of said output means, lock nut means threaded on said worm means, spring means interposed between said lock nut means and said piston means and operatively connected therebetween to provide rotational restraint to said lock nut means with respect to said piston means while providing an axial force urging said piston means and said lock nut means in opposite axial directions to thereby load opposing flanks of the threads of a threaded connection between said worm means and said piston means and between said worm means and said lock nut means to thereby reduce lost motion in the threaded connections.

2. A steering gear comprising a housing, an input member mounted for turning movement in said housing and extending from one end thereof, an output member operatively mounted for turning movement in said housing and extending outwardly therefrom, operator means mounted for longitudinal sliding movement in said housing, rotatable worm means extending axially through said operator means, meshing helical thread means operatively connecting said worm means and said operator means so that rotation of said worm means produces longitudinal sliding movement of said operator means, said output member being drivingly connected to said operator means so that longitudinal sliding movement of said operator means will produce rotation of said output means, lock nut means threaded on said worm means and disposed within said operator means, spring means yieldably interposed between closely adjacent inner faces of said lock nut means and said operator means and operatively connected therebetween to provide rotational restraint to said lock nut means with respect to said operator means, said spring means having spring arm means to provide axial loads to said lock nut means and said operator means to thereby load opposing flanks of the meshing helical thread means operatively connecting said worm means to said operator means and said lock nut means to thereby reduce lost motion in the threaded connections therebetween.

3. A hydraulically powered steering gear comprising a housing, input means mounted for turning movement in said housing and extending from one end thereof, an output member operatively mounted for turning movement in said housing and extending outwardly therefrom, hydraulically actuated piston means mounted for longitudinal sliding movement in said housing and cooperating therewith to provide first and second expansible and contractible fluid chambers in said housing, valve means having first and second relatively rotatable valve members operatively mounted in said housing for supplying and exhausting pressure fluid to and from said chambers, rotatable worm means operatively connected to said valve means extending axially through said piston means and threadedly connected thereto, means connecting one of said valve members to said worm so that the other of said valve members can be relatively rotated in response to rotation of said input, said piston means having a rack on the external portion thereof, said output member having gear means engaging said rack so movement of said piston means will produce rotation of said output means, lock nut means threaded on said worm means, disc spring means operatively disposed between said piston means and said lock nut means to limit relative rotation therebetween, said spring means having arcuately extending spring arms engaging an end face of said lock nut means to provide axial load to said lock nut means and said piston means to thereby load opposing flanks of the threads of threaded connections between said worm means and said piston means and said lock nut means thereby reducing lost motion therebetween and improving responsiveness of operation of said valve means on turning movement of said input.

* * * * *